United States Patent
Du

(10) Patent No.: US 12,439,188 B2
(45) Date of Patent: Oct. 7, 2025

(54) MICRO-ELECTRO-MECHANICAL SYSTEMS (MEMS) MICROPHONE ASSEMBLY

(71) Applicant: HARMAN INTERNATIONAL INDUSTRIES, INCORPORATED, Stamford, CT (US)

(72) Inventor: Yu Du, Novi, MI (US)

(73) Assignee: Harman International Industries, Incorporated, Stamford, CT (US)

(*) Notice: Subject to any disclaimer, the term of this patent is extended or adjusted under 35 U.S.C. 154(b) by 512 days.

(21) Appl. No.: 17/919,839

(22) PCT Filed: Apr. 22, 2020

(86) PCT No.: PCT/US2020/029278
§ 371 (c)(1),
(2) Date: Oct. 19, 2022

(87) PCT Pub. No.: WO2021/216058
PCT Pub. Date: Oct. 28, 2021

(65) Prior Publication Data
US 2023/0156386 A1 May 18, 2023

(51) Int. Cl.
*H04R 1/04* (2006.01)
*B81B 3/00* (2006.01)
(Continued)

(52) U.S. Cl.
CPC .............. *H04R 1/04* (2013.01); *B81B 3/0021* (2013.01); *H04R 1/083* (2013.01); *H05K 1/181* (2013.01);
(Continued)

(58) Field of Classification Search
CPC .......................................... B81B 3/0018–0032
See application file for complete search history.

(56) References Cited

U.S. PATENT DOCUMENTS 9,955,246 B2 4/2018 Reese et al.
10,154,330 B2 12/2018 Baumhauer, Jr. et al.
(Continued)

FOREIGN PATENT DOCUMENTS

CN 103686568 A 3/2014
CN 203482390 U 3/2014
(Continued)

OTHER PUBLICATIONS

International Search Report dated Jan. 19, 2021 for PCT Appn. No. PCT/US2020/029278 filed Apr. 22, 2020, 17 pgs.
(Continued)

*Primary Examiner* — Christine S. Kim
*Assistant Examiner* — Cole Leon Lindsey
(74) *Attorney, Agent, or Firm* — Brooks Kushman P.C.

(57) ABSTRACT

In at least one embodiment, a microphone assembly including an enclosure, a first printed circuit board (PCB) and a microphone assembly is provided. The microphone assembly includes a sub-casing, a micro-electro-mechanical systems (MEMS) transducer, and a second PCB. The MEMS transducer positioned in the sub-casing and the second PCB supports the MEMS transducer. The first PCB defines a first acoustic path positioned below the second PCB and the MEMS transducer. The second PCB defines a first audio port positioned directly below the MEMS transducer. The enclosure defines a first acoustic opening that is positioned directly below the first acoustic path to enable an audio input signal to pass through the first audio port and to an underside of the MEMS transducer. The enclosure defines a second acoustic opening that is positioned at a distance of between 3 to 30 mm from the first acoustic opening.

18 Claims, 5 Drawing Sheets

(51) Int. Cl.
*H04R 1/08* (2006.01)
*H05K 1/18* (2006.01)

(52) U.S. Cl.
CPC ............ *B81B 2201/0257* (2013.01); *H04R 2201/003* (2013.01)

(56) References Cited

U.S. PATENT DOCUMENTS

| | | | | |
|---|---|---|---|---|
| 2015/0010191 A1* | 1/2015 | Baumhauer, Jr. | ........ | H04R 1/04 381/355 |
| 2015/0014796 A1* | 1/2015 | Dehe | ..................... | B81B 3/0021 257/416 |
| 2015/0181346 A1 | 6/2015 | Jingming | | |
| 2018/0002159 A1* | 1/2018 | Cargill | ................. | H04R 19/005 |

FOREIGN PATENT DOCUMENTS

| | | |
|---|---|---|
| CN | 104284284 A | 1/2015 |
| CN | 105142085 A | 12/2015 |
| CN | 204968105 U | 1/2016 |
| CN | 206602610 U | 10/2017 |
| CN | 108141679 A | 6/2018 |
| CN | 208924426 U | 5/2019 |
| EP | 2822298 A1 | 1/2015 |
| GB | 2582386 A | 9/2020 |
| JP | 2008067173 A | 3/2008 |
| JP | 2014158140 A | 8/2014 |

OTHER PUBLICATIONS

Second Chinese Office Action for CN Application No. 202080099637.4 filed Oct. 10, 2022, dated Nov. 22, 2024, 11 pages.
European Office Action dated Jul. 5, 2024 for European Application No. 20724704.0 filed Oct. 20, 2022, 10 pgs.
Japanese Office Action dated Jun. 28, 2024 for Japanese Application No. 2022-556545 filed Sep. 20, 2022, 5 pgs.
Chinese Office Action dated May 24, 2024 for Chinese Application No. 202080099637.4 filed Oct. 10, 2022, 14 pgs.
Korean Office Action for KR Application No. 2022-7033673 filed Sep. 27, 2022, dated Nov. 18, 2024, 7 pages.
Third Chinese Office Action for CN Application No. 202080099637.4 filed Oct. 10, 2022, dated Jul. 8, 2025, 24 pages.

* cited by examiner

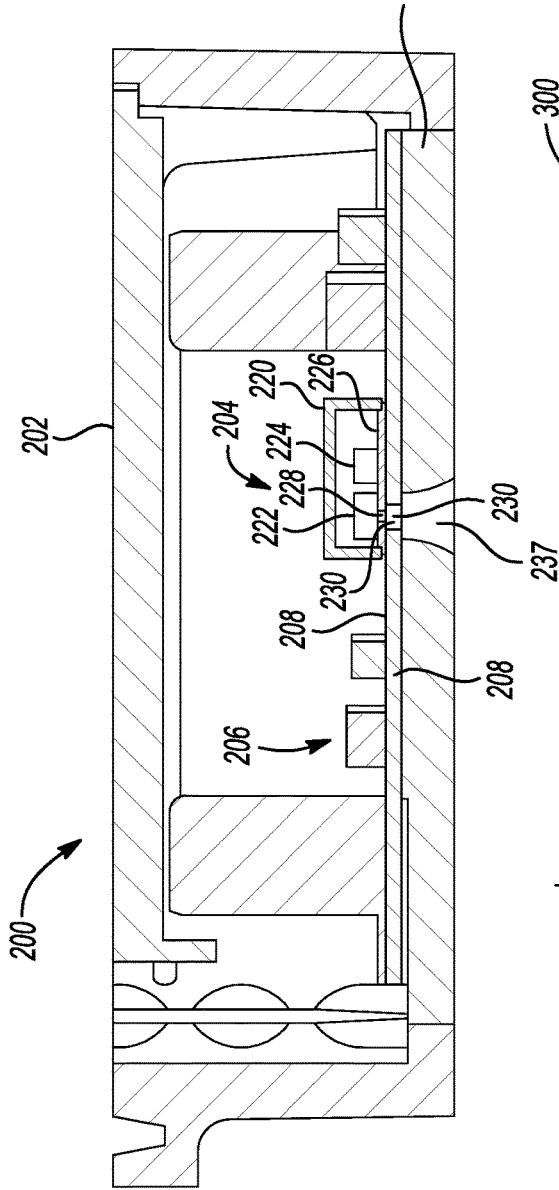
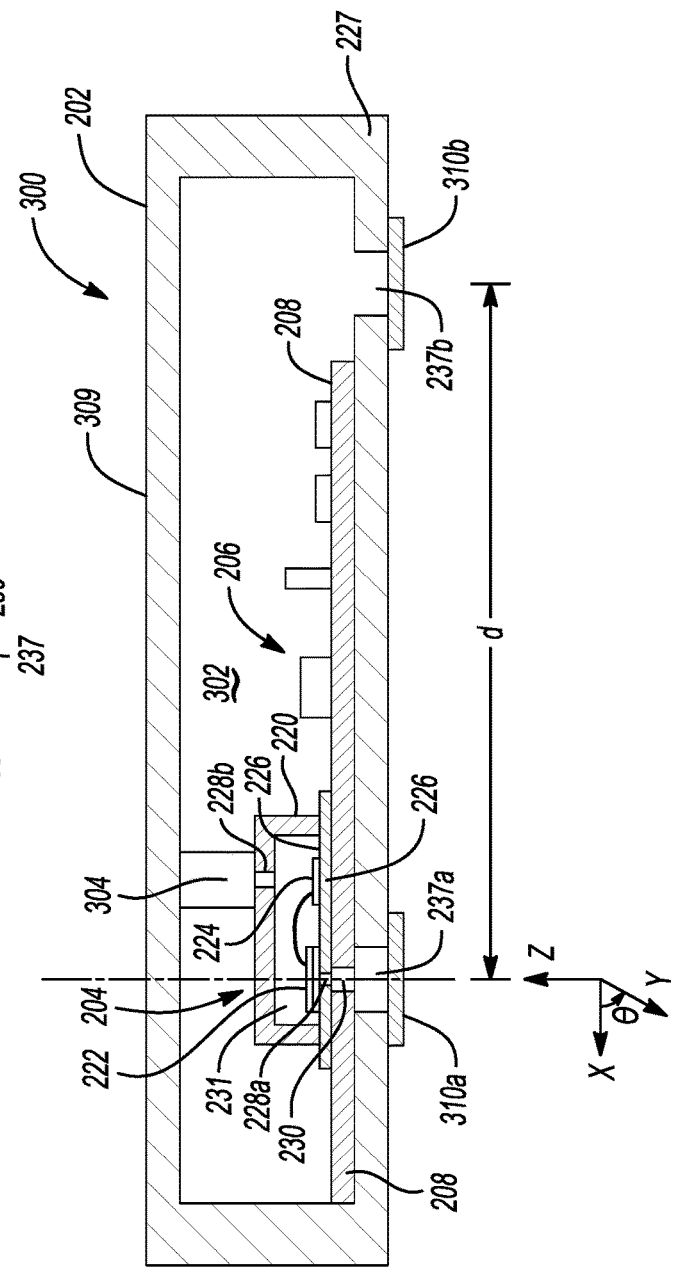

MICRO-ELECTRO-MECHANICAL SYSTEMS (MEMS) MICROPHONE ASSEMBLY

CROSS-REFERENCE TO RELATED APPLICATION

This application is the U.S. national phase of PCT Application No. PCT/US2020/029278 filed on Apr. 22, 2020, the disclosure of which is incorporated in its entirety by reference herein.

TECHNICAL FIELD

Aspects as disclosed herein generally relate to a microphone such as a micro-electro-mechanical systems (MEMS) microphone for a microphone assembly that can be adapted to form a microphone with different directivity patterns (e.g., uni-directional vs. omni-directional) and/or frequency response shapes. The disclosed MEMS microphone assembly may be used for any number of applications including, but not limited to, active noise cancellation (ANC) techniques and voice pickup in hands-free phone applications. These aspects and others will be discussed in more detail herein.

BACKGROUND

U.S. Pat. No. 10,154,330 to Baumhauer et al. provides a micro-electro-mechanical systems (MEMS) microphone assembly. The assembly includes an enclosure, a MEMS transducer, and a plurality of substrate layers. The single MEMS transducer is positioned within the enclosure. The plurality of substrate layers support the single MEMS transducer. The plurality of substrate layers define a first transmission mechanism to enable a first side of the single MEMS transducer to receive an audio input signal and a second transmission mechanism to enable a second side of the single MEMS transducer to receive the audio input signal.

U.S. Pat. No. 9,955,246 to Reese et al. provides a micro-electro-mechanical systems (MEMS) microphone assembly. The assembly includes an enclosure, a single micro-electro-mechanical systems (MEMS) transducer, a substrate layer, and an application housing. The single MEMS transducer is positioned within the enclosure. The substrate layer supports the single MEMS transducer. The application housing supports the substrate layer and defining at least a portion of a first transmission mechanism to enable a first side of the single MEMS transducer to receive an audio input signal and at least a portion of a second transmission mechanism to enable a second side of the single MEMS transducer to receive the audio input signal.

SUMMARY

In at least one embodiment, a microphone assembly including an enclosure, a first printed circuit board (PCB) and a microphone assembly is provided. The microphone assembly includes a sub-casing, a micro-electro-mechanical systems (MEMS) transducer, and a second PCB. The MEMS transducer positioned in the sub-casing and the second PCB supports the MEMS transducer. The first PCB defines a first acoustic path positioned below the second PCB and the MEMS transducer. The second PCB defines a first audio port positioned directly below the MEMS transducer. The enclosure defines a first acoustic opening that is positioned directly below the first acoustic path to enable an audio input signal to pass through the first audio port and to an underside of the MEMS transducer. The enclosure defines a second acoustic opening that is positioned at a distance of between 3 to 30 mm from the first acoustic opening.

In at least another embodiment, a microphone assembly including an enclosure, a first printed circuit board (PCB), a post, and a microphone sub-assembly is provided. The microphone sub-assembly includes a sub-casing, a micro-electro-mechanical systems (MEMS) transducer, at least one port hole. The micro-electro-mechanical systems (MEMS) transducer is positioned in the sub-casing to receive an audio input signal. The at least one port is positioned on a topside of the sub-casing. The post is positioned over the at least one port hole to seal the sub-casing.

In at least another embodiment, a microphone assembly including an enclosure, a first printed circuit board (PCB) and a microphone sub-assembly is provided. The microphone sub-assembly includes a sub-casing, a micro-electro-mechanical systems (MEMS) transducer, at least one port hole, and a cover. The micro-electro-mechanical systems (MEMS) transducer is positioned in the sub-casing to receive an audio input signal. The at least one port is positioned on a topside of the sub-casing. a cover positioned over the at least one port hole and being moveable about the first port hole to provide a plurality of frequency responses based on a location of the cover relative to the first port hole.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 4 illustrates one example of a microphone assembly;

FIG. 5 illustrates a microphone assembly in accordance to one embodiment;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that directional terms that may be noted herein (e.g., "upper", "lower", "inner", "outer", "top", "bottom", etc.) simply refer to the orientation of various components of a transducer assembly in connection with the microphone assembly as illustrated in the accompanying figures. Such terms are provided for context and understanding of the embodiments disclosed herein.

A microphone assembly may include, but not limited to, a microphone sub-assembly including a micro-electro-mechanical systems (MEMS) based microphone element (e.g., transducer) or an electret condenser microphone (ECM), a printed circuit board (PCB) assembly on which the microphone element is mounted, and a housing (or casing) that encloses the foregoing features. Thus, the microphone assembly is understood to be larger in size than the MEMS microphone element package (or the ECM).

Customer applications may require microphone elements to provide different frequency response shapes and/or directivities. This means that different microphone element models may be needed in overall microphone assemblies for various specific applications. Embodiments as set forth herein attempt to extend acoustic design parameters from the microphone element level (e.g., MEMS mic package design) (or sub-assembly level) to the assembly level. That is, by modifying structural and geometric parameters of the assembly housing/casing, a single common microphone element package may be used in multiple microphone subassembly designs. For example, microphone assembly designs in a vehicle may currently require different and dedicated MEMS microphone elements to satisfy hands-free communication or active noise cancellation (ANC) applications. Embodiments as set forth herein, may provide a single common MEMS microphone element model that can be used for both applications, in which only some design features on the module housing level need to be modified.

For automotive applications, the overall microphone assembly may include a protective housing and is installed into the car body. For other applications, microphone elements and the PCB may be mounted directly on a housing of the product (e.g., cellphone). In this case, the final product housing (e.g., the cellphone) may enclose (or store) the microphone assembly to the protective housing of the microphone assembly.

Figure 1:
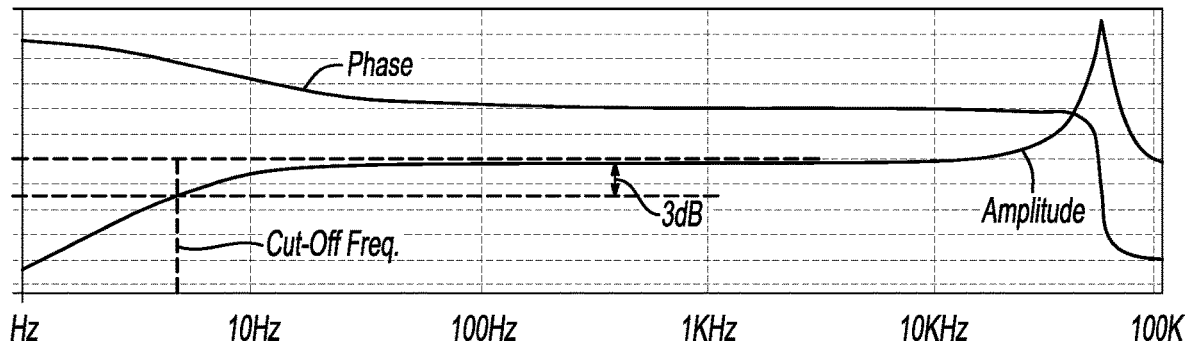
FIG. 1 illustrates one example of an amplitude response curve for a microphone.
Figure 2:
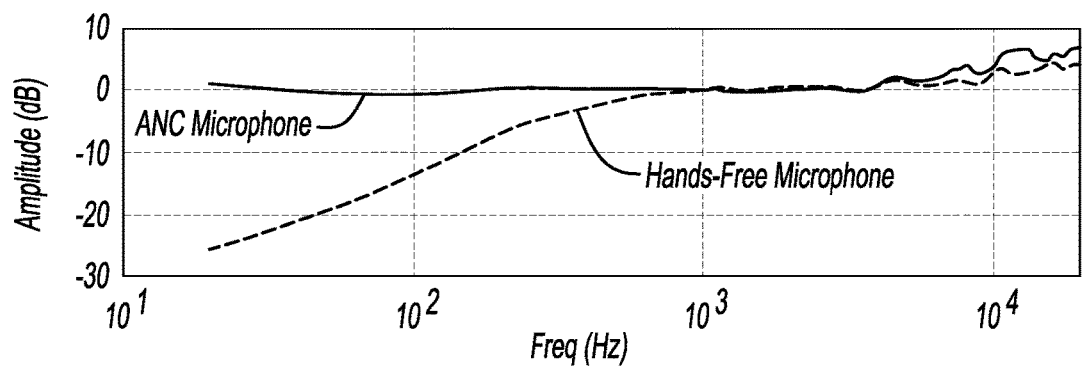
FIG. 2 illustrates an example of different cut-off frequencies in various automotive audio applications.

FIG. 1 illustrates one example of an amplitude response curve for a microphone as a function of frequency. Starting from the lowest frequency defined on the plot, the curve typically presents a rising response shape characterized by a cutoff frequency. The cutoff frequency for the microphone may be generally defined as a frequency point at which a sensitivity is 3 dB (or other suitable value) below its normal sensitivity measured at 1 kHz. FIG. 2 illustrates one example of cutoff frequencies for various applications (e.g., a microphone used in connection with ANC or a microphone used in connection with a hands-free communication implementations). These microphone-based applications may be applicable to vehicles. As shown, the cutoff frequency for microphones used in ANC is less than 20 Hz and the cutoff frequency for microphones used for hands-free applications is greater than 200 Hz.

Figure 3:
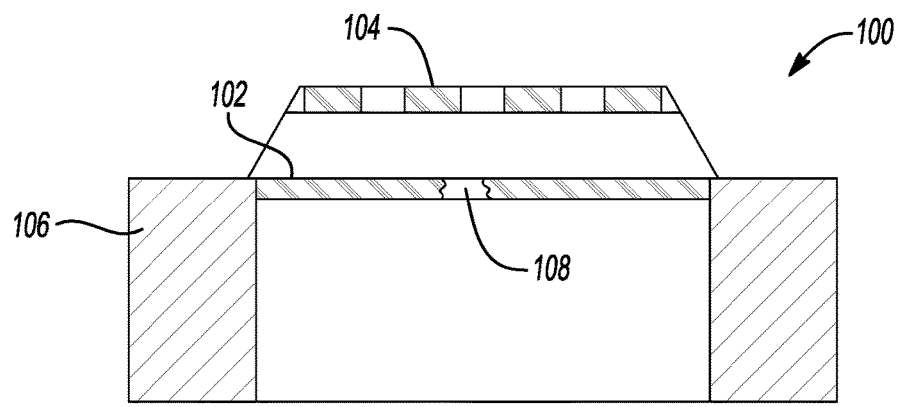
FIG. 3 illustrates one example of a MEMS microphone for achieving a single cut off frequency.

FIG. 3 illustrates one example of a MEMS microphone transducer 100 for achieving a single cut off frequency. The transducer 100 includes a diaphragm 102, a backplate 104, and a baffle 106. The diaphragm 102 generally moves under acoustic pressure excitation. The backplate 104 is provided with multiple holes to thereby allow acoustic waves to pass therethrough which is considered acoustically transparent. The diaphragm 102 and the backplate 104 form a capacitor that transfers the mechanical motion of the diaphragm 102 to electrical (e.g., voltage) output of the transducer 100. The diaphragm 102 defines a path 108 that creates the cutoff frequency of an audio output signal. When assembled in a MEMS microphone package (or microphone assembly), the baffle 106 and a package casing (not shown in FIG. 3) ensures that the external sound waves may only reach from one side of the diaphragm 102 to the other through the path 108. It may be easier for low frequency sound waves with longer wavelengths to pass through the path 108 to reach both sides of the diaphragm 102. This may result in less to no net pressure differences between the two sides of the diaphragm 102 (e.g., no net motion) at low frequencies than at high frequencies. This may effectively form a first-order low pass filter with a cut off frequency proportional to the size of the path 108. Therefore, to change the cutoff frequency of the MEMS microphone transducer 100, the size of the path 108 needs to be adjusted. As such, existing implementations may require the use of different MEMS elements for each individual application with a specific cut-off frequency target or a specific frequency response.

FIG. 4 illustrates one example of a microphone assembly 200 (or assembly 200). The microphone assembly 200 includes a protective housing or enclosure 202, a microphone sub-assembly 204, electronic circuitry 206, and a printed circuit board (PCB) 208. The electronic circuitry 206 may be mounted on the PCB 208 together with the microphone sub-assembly 204 and perform any number of audio processing applications such as, but not limited to, ANC, hands free operation, etc. The electronic circuitry 206 may interface with the microphone sub-assembly 204 to perform operations related to the foregoing audio applications.

The microphone sub-assembly 204 includes a sub-casing 220, a MEMS transducer (or microphone) 222, an application-specific integrated circuit (ASIC) 224, and a PCB base 226. The MEMS transducer 222 and the ASIC 224 are positioned on the PCB base 226. The sub-casing 220 encloses the MEMS transducer 222, the ASIC 224, and seals to (typically by soldering) the PCB base 226 along its perimeter. It is recognized that the MEMS transducer 222 may also be implemented as an ECM. The PCB base 226 defines a first audio port 228. The PCB 208 defines a first acoustic path 230 and the base part of the housing 202 defines a first acoustic opening 237. The first acoustic path 230 and the first acoustic opening 237 axially align vertically with the first audio port 228. While not shown, the MEMS transducer 222 includes a diaphragm that oscillates or is excited in response to an audio pressure that impinges on the diaphragm. An underside of the diaphragm is exposed to the environment to enable the audio signal to enter into the first audio port 228 provided by the PCB base 226, the first acoustic path 230 provided by the PCB 208, and the first acoustic opening 237 provided by the housing 202. The ASIC 224 provides an electrical output indicative of the sound captured by the MEMS transducer 222.

FIG. 5 illustrates a microphone assembly 300 in accordance to one embodiment. The assembly 300 includes the protective housing 202, the microphone sub-assembly 204, the electronic circuitry 206, and the PCB 208. Similarly, as noted above in connection with FIG. 4, the electronic circuitry 206 may be mounted on the PCB 208 together with the microphone sub-assembly 204 and perform any number of audio processing applications such as, but not limited to, ANC, hands free operation, etc. The electronic circuit 206 may interface with the microphone sub-assembly 204 to perform operations related to the foregoing audio applications.

Similarly, as noted in connection with FIG. 4, the microphone assembly 204 includes the sub-casing 220, the microphone transducer 222 (MEMS or ECM), the ASIC 224, and the PCB base 226. The MEMS transducer 222 and the ASIC 224 are positioned on the PCB base 226. The PCB base 226 defines a first audio port 228a that is positioned directly below the microphone transducer 222. A first acoustic path 230 is defined by the PCB 208. A base 227 of the enclosure 202 defines a first acoustic opening 237a and a second acoustic opening 237b. When assembled, the first audio port 228a provided by the PCB base 226, the first acoustic path 230 provided by the PCB 208, and the first acoustic opening 237a provided by the enclosure 202 are axially aligned in the vertical direction. The second acoustic opening 237b opens directly to a cavity or volume 302 defined by the enclosure 202. The first acoustic opening 237a and the second acoustic opening 237b may be positioned on the same surface of the enclosure 202 (e.g., the base 227) and separated by a distance, d. The distance d may be preferably within the range of 3 to 30 mm. When the microphone assembly 300 is configured as a uni-directional microphone, the microphone output sensitivity is proportional to the value of d. If d is too small, this may lead to a very low microphone sensitivity that may not be optimal. When the microphone assembly 300 is configured as an omni-directional microphone with various cutoff frequencies, the assembly 300 relies on the sound pressure amplitudes presented at the first and second acoustic openings 237a, 237b being similar to one another. If d is too large, this may lead to differences in sound pressure amplitudes presented at the first and second acoustic openings 237a, 237b. It is recognized that the second acoustic opening 237b may also be positioned along any of one of vertically extending side walls of the enclosure 202 while maintaining an accumulated distanced in the preferred range.

The first acoustic opening 237a, the first acoustic path 230 and the first audio port 228a enable the underside of the microphone transducer 222 to be vented to a sound field external to the assembly 300. The sub-casing 220 defines at least one second audio port 228b (hereafter port hole 228b) positioned on a top side thereof. Similarly, the second acoustic opening 237b may enable a sound field external to the assembly 300 to enter into the cavity or volume 302 defined by the enclosure 202. This may subsequently enable the topside of the microphone transducer 222 to be vented to the external sound field through port hole 228b. When the microphone assembly 300 is configured as an omnidirectional microphone with various cutoff frequencies, the size of the opening area of the port hole 228b determines the cutoff frequency. If the port hole 228b is of a circular shape, a preferred diameter range is between 0.01 mm and 1 mm. This results in a cut-off frequency that may be suitable for hands-free microphone applications. If the port hole 228b is of other geometric shapes and/or in a of plurality forms, the effective total opening area is preferred to be in the range equivalent to that provided by a circular port hole with a diameter from 0.01 mm to 1 mm.

A post 304 may be positioned on the top side of the sub-casing 220 and mounted directly on top of the port hole 228b. The post 304 may be integrated with the enclosure 202. The post 304 extends from a top side of the sub-casing 220 to an underside of a top portion 309 of the enclosure 202. When provided, the post 304 may serve as a sealing mechanism and seal the port hole 228b. A first acoustic resistance element 310a (e.g., cloth, sintered material, foam, micro-machined or laser drilled hole arrays, etc.) may be positioned below the base 227 of the enclosure 202. The first acoustic resistance element 310a may be placed directly underneath or above the first acoustic opening 237a. A second acoustic resistance element 310b (e.g., cloth, sintered material, foam, micro-machined or laser drilled hole arrays, etc.) may also be positioned below the base 227 of the enclosure 202. The second acoustic resistance element 310b may be placed directly underneath or above the second acoustic opening 237b. The addition of the first acoustic resistance element 310a and the second acoustic resistance element 310b also act as an ingress protection mechanism to prevent foreign particles and moisture in the external environment from entering into the interior of the microphone assembly 300.

Figure 7:
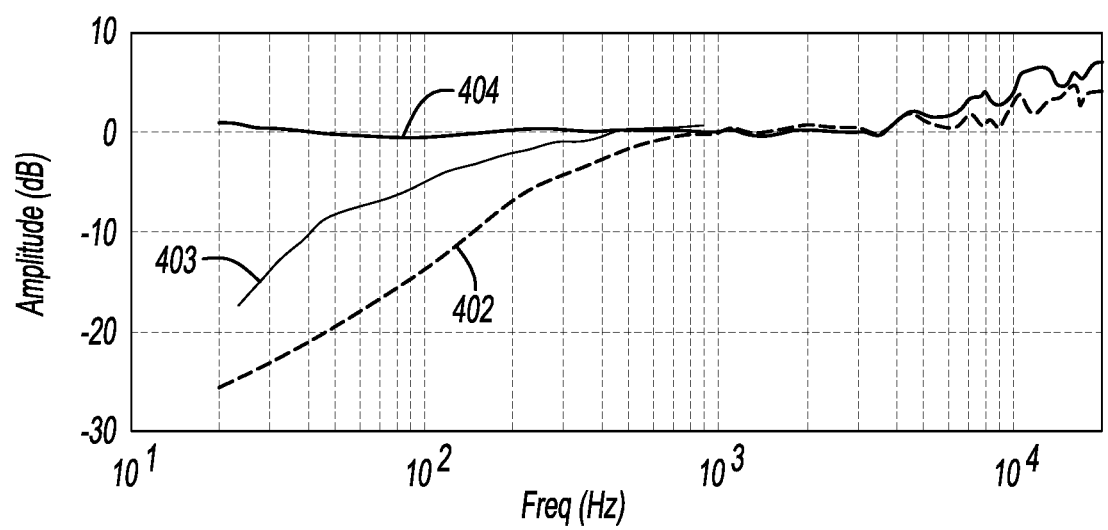
FIG. 7 illustrates one example of frequency response curves in accordance to one embodiment.

It is recognized that any one or more of the post 304, the first acoustic resistance element 310a and the second acoustic resistance element 310b may or may not be utilized on the assembly 300. The utilization of the post 304, the first acoustic resistance element 310a, and the second acoustic resistance element 310b may provide differing frequency responses or directivity patterns for the assembly 300. For example, in the event the post 304, the first acoustic resistance element 310a, and the second acoustic resistance element 310b are not implemented on the assembly 300, the port hole 228b is unsealed and both sides of the microphone diaphragm are exposed to the external sound field. In this case, the port hole 228b effectively acts as the path 108 explained in connection with FIG. 3. Thus, the microphone subassembly 204 allows a rising frequency response with a cutoff frequency determined by the size of the opening area of the port hole 228b. The microphone assembly 300 functions as an omni-directional microphone with a rising frequency response as illustrated in the waveform 402 of the plot depicted in FIG. 7. The waveform 402 illustrates a cutoff frequency higher than 200 Hz that may be preferable for applications such as hands-free communications.

In the event the post 304 is utilized to seal the port hole 228b in the assembly 300 and the first acoustic resistance element 310a and the second acoustic resistance element 310b are absent, only the underside of the microphone diaphragm is exposed to the external sound field. In such a case, the microphone sub-assembly 204 and thus the microphone assembly 300 perform as an omni-directional microphone with a flat frequency response as illustrated in the waveform 404 of the plot depicted in FIG. 7. The waveform 404 illustrates a cutoff frequency that is lower than 20 Hz that may be preferable for applications such as ANC.

In the event the microphone assembly 300 is arranged as an omni-directional microphone with various cutoff frequencies by either utilizing the post 304 or not utilizing the post 304, it may not be necessary to implement the first acoustic resistance element 310a and the second acoustic resistance element 310b. However, in practice, it may be preferable to include the first acoustic resistance element 310a and the second acoustic resistance element 310b with small resistance values to serve as an ingress protection mechanism to prevent foreign particles and moisture intrusion.

Without the post 304, but with the first acoustic resistance element 310a and the second acoustic resistance element 310b, the microphone assembly 300 may also be configured to provide a uni-directional (cardioid) response characteristic. In the case where the audio source or talker is located to the left of the assembly 300, it may be desirable to point a pickup sensitivity beam (polar pattern) toward the left side (θ=0°), but discriminate against the pickup of unwanted sound from other directions (e.g., from the right or behind the microphone assembly 300). Without the post 304, the microphone assembly 300 allows the external sound or audio signal to enter the first acoustic opening 237a thereby reaching the underside of the transducer 222 (thus the diaphragm). Similarly, the external sound or audio signal is transmitted through the second acoustic opening 237b thereby reaching the upper side of the transducer 222 (thus the diaphragm). The output of the microphone sub-assembly 204 may be a function of the subtraction or "acoustical gradient" between the two acoustic pressures impinging on the two sides of the transducer 222 (or the diaphragm). Due to the differences in the transmission paths, there will be a relative phase delay corresponding to a time difference for a sound source to reach the two sides of the transducer 222. Such a phase delay enables the microphone assembly 300 to achieve desirable performance, like certain polar patterns.

To achieve the desired cardioid directivity shape, a certain amount of the acoustic resistance level, $R_{sb}$, of the second acoustic resistance element 310b may be needed to satisfy a certain mathematical relationship determined by the delay distance, d, and an acoustic compliance, $C_v$. In general, $R_{sb}$ should be proportional to the quotient of $d/C_v$, where the value of $C_v$ is determined by the combined air volumes of the second acoustic opening 237b, the cavity 302, the port hole 228b and a volume 231 enclosed by the sub-casing 220 of the microphone element 204. It should be noted that the first acoustic resistance element 310a may be omitted or included. The acoustic resistance value for the first acoustic resistance element 310a may be smaller than that of the second acoustic resistance element 310b and may be used to prevent foreign particles and moisture intrusion.

Figure 8:
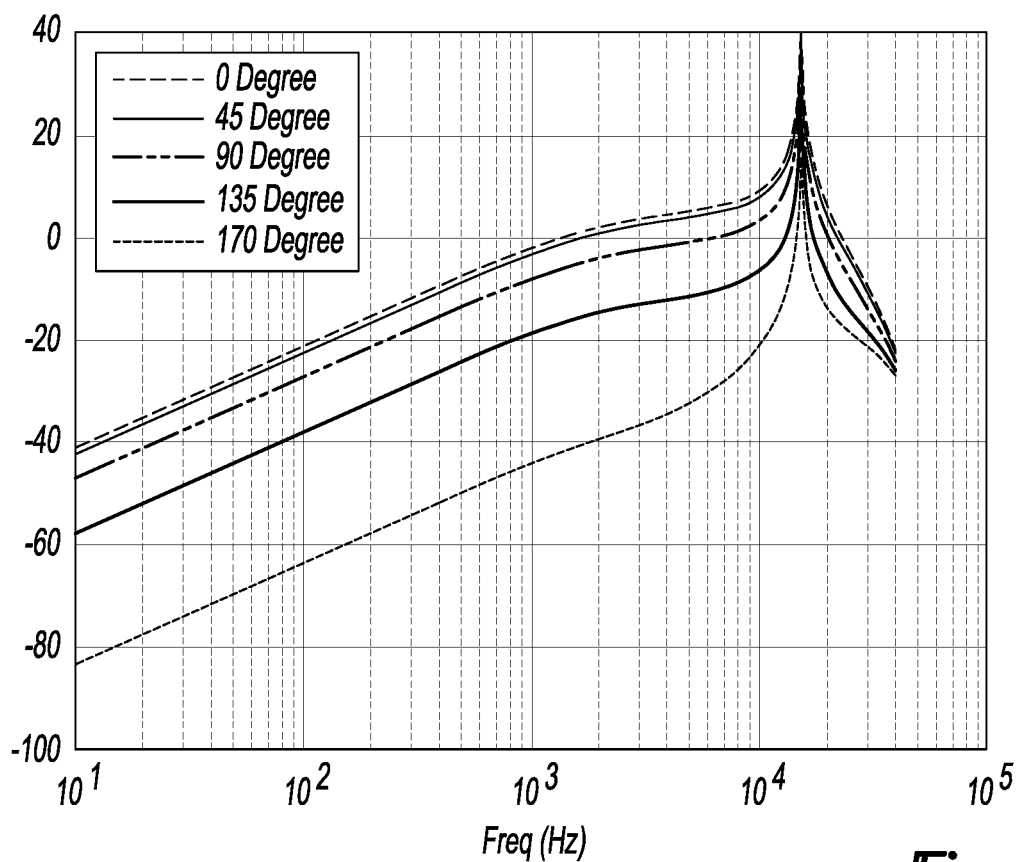
FIG. 8 illustrates one example of various frequency responses in accordance to one embodiment.

FIG. 8 depicts an example of simulated frequency response shapes of the microphone assembly 300 when configured as a uni-directional microphone as set forth in FIG. 5 in accordance to one embodiment. In particular, FIG. 8 plots the frequency response ratios in dB of the electrical outputs of the microphone assembly 300 to the acoustical inputs transmitted from various directions indicated by θ to the first acoustic opening 237a versus the frequency.

Figure 9:
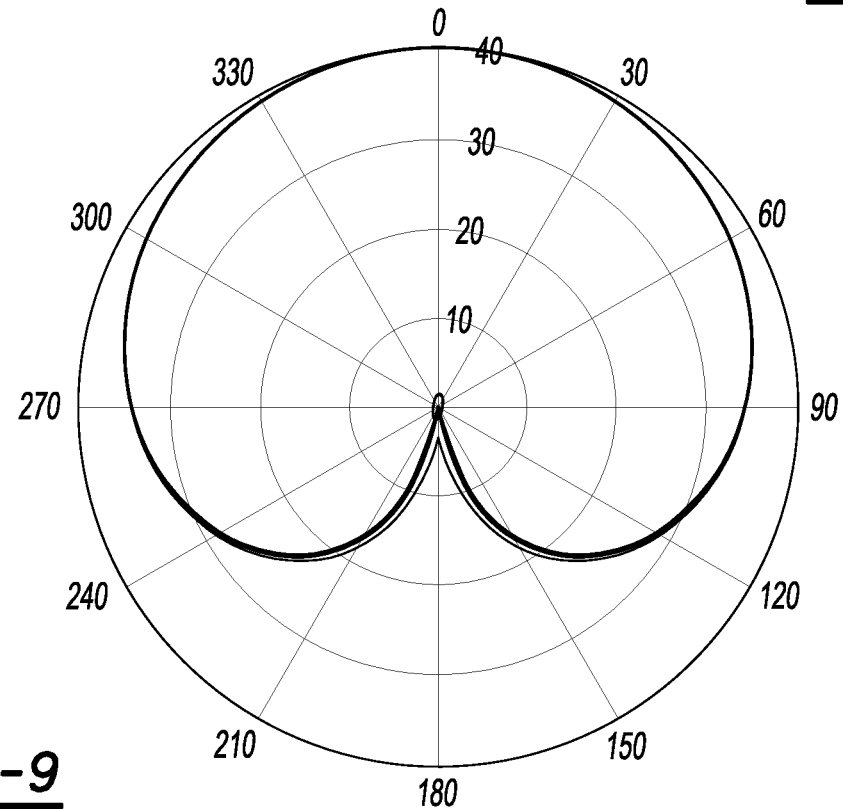
FIG. 9 illustrates one example of various directivities in accordance to one embodiment.

FIG. 9 is a simulated plot that illustrates one example of a cardioid polar directivity or spatial filtering attributed to the microphone assembly 300 as described above in connection with FIG. 5.

Figure 6:
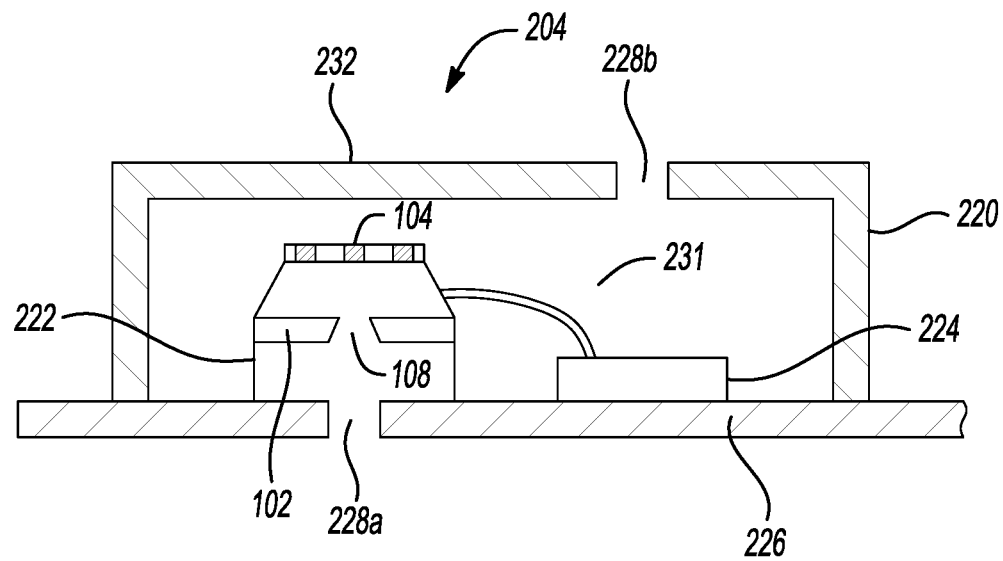
FIG. 6 illustrates a detailed implementation of a microphone sub-assembly in accordance to one embodiment.

FIG. 6 illustrates a detailed view of the microphone sub-assembly 204 in accordance to one embodiment. The transducer 222 includes a diaphragm 102 that is moveable and a backplate 104 that is immovable but acoustically transparent owning to the plurality number of through holes distributed in the backplate 104. The transducer 222 and the ASIC 224 are positioned on the PCB base 226 and enclosed in the cavity 231 formed by the sub-casing 220. As noted above, the PCB base 226 defines the first audio port 228a, and the sub-casing 220 defines the port hole 228b. The external audio signal can reach the underside of the diaphragm 102 through the first audio port 228a and the cavity 231 that is sealed between the transducer 222 and the PCB base 226. Similarly, the external audio signal can reach the topside of the diaphragm 102 through the port hole 228b and the cavity 231 that is sealed between the transducer 222, the sub-casing 220 and the PCB base 226. In addition, the audio signal can also reach from one side of the diaphragm 102 to the other side through the path 108 defined by the diaphragm 102. The diaphragm 102 is excited by the net acoustic pressure (i.e., the pressure difference between the two sides) that is applied. As noted previously, for the external audio signal, both the path 108 and the audio port 228b function as leak paths with a cut-off frequency value that is based on their relative size. This aspect may result in a rising frequency response shape of the microphone assembly 300. Since it is generally more difficult to alter the size of the path 108 in addition to the overall size of the microphone sub-assembly 204, the microphone assembly 300 discloses an approach to adjust the cutoff frequency of the rising response by adjusting the sealing or unsealing status (i.e., the opening area) of the port hole 228b. For example, the path 108 as defined by the transducer 222 of the microphone sub-assembly 204 may be omitted or ignored if kept small so that, with the port hole 228b being sealed, the cutoff frequency of the rising response of the microphone sub-assembly 204 may be lower than 20 Hz.

In light of the foregoing, the assembly 300 provides a plurality of frequency response shapes or directivities while utilizing a single microphone sub-assembly 204 in which the overall size of the path 108 as defined by the diaphragm 102 is fixed. Based on the utilization status of the post 304, the first acoustic resistance element 310a, the second acoustic resistance element 310b and on the values for the first acoustic resistance element 310a and the second acoustic resistance element 310b, the microphone assembly 300 may behave as an omni-directional microphone with a flat frequency response (i.e., with a cutoff frequency lower than 20 Hz), an omni-directional microphone with a rising frequency response, or a uni-directional microphone with a cardioid polar directivity.

Figure 10:
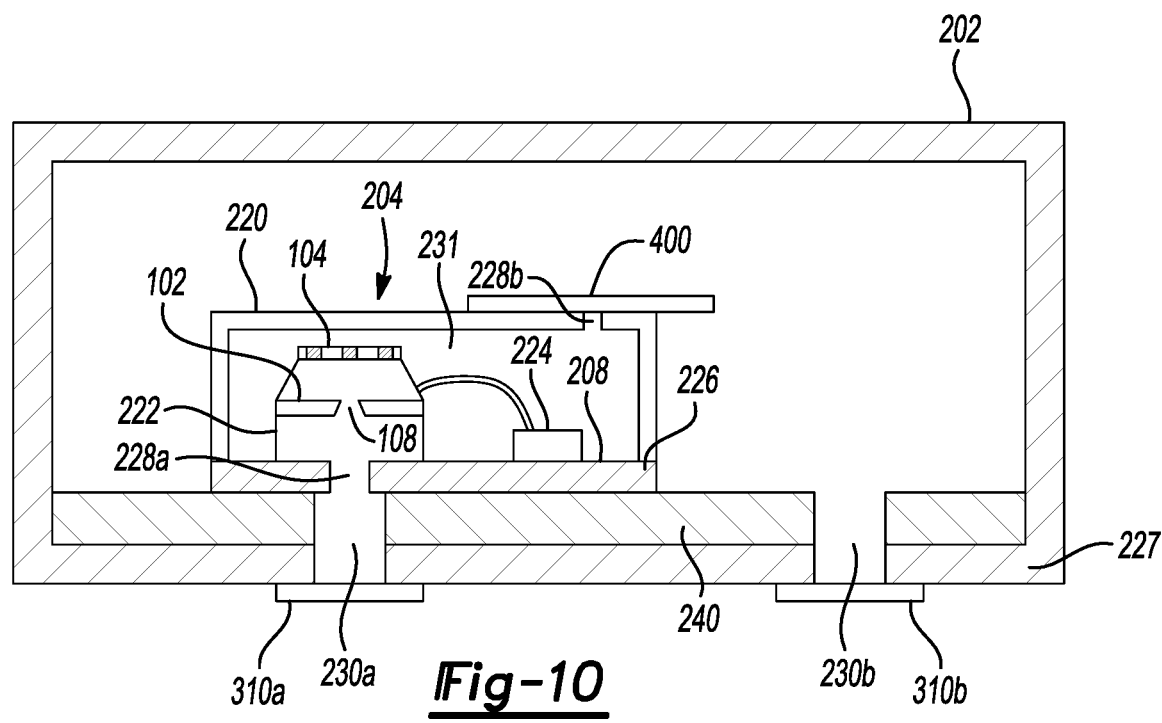
FIG. 10 illustrates another detailed implementation of the microphone assembly in accordance to one embodiment.

FIG. 10 illustrates another detailed view of the sub-casing 220 of the microphone sub-assembly 204 in accordance to one embodiment. A moveable cover 400 is placed over the port hole 228b. In one example, the cover 400 may correspond to adhesive tape or other suitable material. Similar to the functionality of the post 304 in FIG. 5, the cover 400 may serve as a sealing mechanism and seal the port hole 228b. In another example, the cover 400 may slide relative to the port hole 228b. A first guide rail and a second guide rail may be axially spaced apart from one another and positioned on the top-side of the sub-casing 220. The cover 400 may slide along the first guide rail and the second guide rail to provide varying levels of coverage of the port hole 228b ranging from 0% to 100%. The port hole 228b may be fully open when the cover 400 is moved away from the port hole 228b. Conversely, the port hole 228b may be completely closed or covered by the cover 400. The cover 400 may also be positioned at any number of positions relative to the port hole 228b such that the port hole 228b is uncovered, partially covered, or completely covered.

As noted above, the external audio signal reaches both the underside of the diaphragm 102 (e.g., via the first audio port 228a and the first acoustic path 230) and the top side of the diaphragm 102 (e.g., via the second acoustic opening 237b and the port hole 228b) through the second audio port 228b. It is easier for low frequency sound waves with longer wavelengths to pass through a small opening. Thus, depending on the size of the port hole 228b, positioning the cover 400 at different positions related to the port hole 228b may provide an omni-directional microphone with varying frequency responses without significantly altering the overall design of the microphone sub-assembly 204 and the microphone assembly 300. For example, in the event the cover 400 is not implemented or is positioned to leave the second audio port 228b substantially open on the assembly 300, the assembly 300 performs as an omni-directional microphone with a rising frequency response as illustrated in the waveform 402 of the plot depicted in FIG. 7. In the event the cover 400 fully covers the port hole 228*b*, the microphone assembly 300 behaves as an omni-directional microphone with a flat frequency response as illustrated in the waveform 404 of the plot depicted in FIG. 7. In the event the cover 400 partially covers the second audio port 228*b*, the microphone assembly 300 performs as an omni-directional microphone with a rising frequency response as illustrated in the waveform 403 of the plot depicted in FIG. 7 whose cutoff frequency is between the waveforms 402 and 404.

It is recognized that the first acoustic resistance element 310*a* and the second acoustic resistance element 310*b* may also be implemented on the microphone assembly 300 regardless of whether the cover 400 is provided. The first acoustic resistance element 310*a* and the second acoustic resistance element 310*b* may be provided simply to prevent foreign particles and moisture intrusion. In the event the cover 400 is not utilized while the implementation of the first acoustic resistance element 310*a* and the second acoustic resistance element 310*b* is provided, as long as the acoustic resistance value of the second acoustic resistance element 310*b* satisfies the mathematical relationship described previously, the microphone assembly 300 behaves as a uni-directional microphone with a cardioid directivity pattern.

Figure 11A:
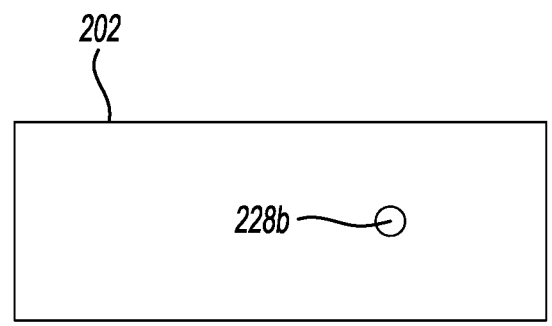
FIGS. 11A-11B illustrate respective top views of a sub-casing of the microphone sub-assembly in accordance to one embodiment.
Figure 11B:
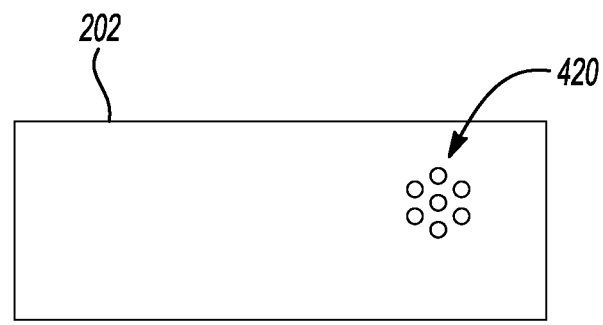

FIG. 11A depicts a top view of the sub-casing 220 and the port hole 228*b* of the microphone sub-assembly 204. FIG. 11B depicts another top view of the sub-casing 220 and the port hole 228*b*. In this case, the port hole 228*b* may be formed as a plurality of holes 420 that take on a desired pattern. One or more of the plurality of holes 420 may be sealed (or covered) to provide a progressively adjustable cut-off frequency. For example, this aspect may enable the assembly 300 to provide an omni-directional microphone with varying frequency responses without significantly altering the overall design of the microphone sub-assembly 204. It is recognized that the number of holes 420 may vary based on the desired criteria of a particular implementation.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A microphone assembly comprising:
an enclosure;
a first printed circuit board (PCB); and
a microphone sub-assembly including:
a sub-casing;
a micro-electro-mechanical systems (MEMS) transducer positioned in the sub-casing; and
a second PCB to support the MEMS transducer,
wherein the second PCB defines a first audio port positioned directly below the MEMS transducer;
wherein the first PCB defines a first acoustic path positioned below the second PCB and the MEMS transducer and axially aligned with the first audio port and;
wherein the enclosure defines a first acoustic opening that is positioned directly below the first acoustic path to enable an audio input signal to pass through the first audio port and to an underside of the MEMS transducer;
wherein the enclosure defines a second acoustic opening that is positioned at a distance of between 3 to 30 mm from the first acoustic opening; and
wherein the sub-casing defines at least one port hole positioned on a top side thereof, and wherein the enclosure includes a post positioned over the at least one port hole to seal the sub-casing.

2. The microphone assembly of claim 1, wherein the first acoustic opening and the second acoustic opening are positioned on a same surface of the enclosure.

3. The microphone assembly of claim 1, wherein the first acoustic opening and the second acoustic opening are positioned on different surfaces of the enclosure.

4. The microphone assembly of claim 1 further comprising a first acoustic resistance positioned about the first acoustic opening and a second acoustic resistance positioned about the second acoustic opening.

5. The microphone assembly of claim 1, wherein the at least one port hole includes a plurality of port holes spaced apart from one another on a top-side of the sub-casing.

6. The microphone assembly of claim 1, wherein the post extends from the top side of the sub-casing to an underside of a top side of the enclosure.

7. The microphone assembly of claim 1, further comprising a cover positioned on a top side of the sub-casing.

8. The microphone assembly of claim 7, wherein the cover slides relative to the at least one port hole to provide a plurality of frequency responses for the assembly.

9. A microphone assembly comprising:
an enclosure;
a first printed circuit board (PCB);
a post; and
a microphone sub-assembly including:
a sub-casing;
a micro-electro-mechanical systems (MEMS) transducer positioned in the sub-casing to receive an audio input signal; and
at least one port hole positioned on a top-side of the sub-casing;
wherein the post is positioned over the at least one port hole to seal the sub-casing.

10. The microphone assembly of claim 9 further comprising a second PCB to support the MEMS transducer and defining a first audio port.

11. The microphone assembly of claim 10:
wherein the first PCB defines a first acoustic path positioned below the second PCB and the MEMS transducer; and
wherein the enclosure defines a first acoustic opening that is positioned directly below the first acoustic path and the first audio port to enable the audio input signal to pass through the first audio port and to an underside of the MEMS transducer.

12. The microphone assembly of claim 11, wherein the enclosure defines a second acoustic opening to enable the audio input signal to pass to a topside of the MEMS transducer.

13. The microphone assembly of claim 12, wherein the second acoustic opening is positioned at a distance of between 3 to 30 mm from the first acoustic opening to increase sensitivity of the MEMS transducer and to minimize differences in sound pressure amplitudes of the audio input signal at the first acoustic opening and the second acoustic opening.

14. The microphone assembly of claim 11, wherein the first acoustic opening and the second acoustic opening are positioned on a same surface of the enclosure.

15. The microphone assembly of claim 11, wherein the first acoustic opening and the second acoustic opening are positioned on different surfaces of the enclosure.

16. The microphone assembly of claim 9, wherein the post extends from the top-side of the sub-casing to an underside of a top side of the enclosure.

17. A microphone assembly comprising:
   an enclosure;
   a first printed circuit board (PCB); and
   a microphone sub-assembly including:
      a sub-casing;
      a micro-electro-mechanical systems (MEMS) transducer positioned in the sub-casing to receive an audio input signal;
      at least one port hole positioned on a top-side of the sub-casing; and
      a cover positioned over the at least one port hole and being moveable about the at least one port hole to provide a plurality of frequency responses based on a location of the cover relative to the at least one port hole.

18. The microphone assembly of claim 17, wherein the cover slides relative to the at least one port hole to provide the plurality of frequency responses.

* * * * *